US012625969B2

(12) United States Patent
Neelakantam et al.

(10) Patent No.: US 12,625,969 B2
(45) Date of Patent: May 12, 2026

(54) HARDWARE-BASED CONTROL OF PERIPHERAL DEVICES

(71) Applicant: QUALCOMM Incorporated, San Diego, CA (US)

(72) Inventors: Arun Kumar Neelakantam, Hyderabad (IN); Piyush Pradeep Jain, Surat (IN)

(73) Assignee: QUALCOMM Incorporated, San Diego, CA (US)

( * ) Notice: Subject to any disclaimer, the term of this patent is extended or adjusted under 35 U.S.C. 154(b) by 53 days.

(21) Appl. No.: 18/765,759

(22) Filed: Jul. 8, 2024

(65) Prior Publication Data

US 2026/0010633 A1     Jan. 8, 2026

(51) Int. Cl.
G06F 21/57          (2013.01)
G06F 21/64          (2013.01)
G06F 21/70          (2013.01)

(52) U.S. Cl.
CPC ............ G06F 21/575 (2013.01); G06F 21/64 (2013.01); *G06F 21/70* (2013.01)

(58) Field of Classification Search
CPC .......... G06F 21/55; G06F 21/64; G06F 21/70; G06F 21/575
See application file for complete search history.

(56) References Cited

U.S. PATENT DOCUMENTS

| | | | | |
|---|---|---|---|---|
| 7,089,344 | B1 | 8/2006 | Rader et al. | |
| 2003/0229798 | A1* | 12/2003 | Dastidar | G06F 12/1466 713/193 |

| | | | | |
|---|---|---|---|---|
| 2008/0183852 | A1* | 7/2008 | Pramer | G06Q 30/02 709/227 |
| 2014/0089617 | A1* | 3/2014 | Polzin | G06F 12/1441 711/E12.091 |
| 2014/0122879 | A1* | 5/2014 | Cummings | G06F 21/85 713/168 |
| 2016/0149921 | A1* | 5/2016 | Potlapally | G06F 21/82 726/7 |
| 2016/0259940 | A1* | 9/2016 | Wang | G06F 21/71 |
| 2017/0177909 | A1* | 6/2017 | Sarangdhar | G06F 21/85 |
| 2017/0330449 | A1* | 11/2017 | Lunardhi | H04L 67/125 |

(Continued)

FOREIGN PATENT DOCUMENTS

EP          1616242 A1     1/2006

OTHER PUBLICATIONS

International Search Report and Written Opinion—PCT/US2025/027563—ISA/EPO—Jul. 17, 2025.

*Primary Examiner* — Shanto Abedin
(74) *Attorney, Agent, or Firm* — Muncy Geissler, Olds & Lowe, P.C.

(57) ABSTRACT

Implementations of systems and methods for controlling one or more peripherals of a computing device. The systems and methods may include determining whether a requested change to a secure register is authorized, adjusting a value stored in the secure register in response to determining that the requested change to the secure register is authorized. The systems and methods may include determining, at the one or more peripherals, one or more parameters of the one or more peripherals based on the value stored in the secure register and controlling a functionality of the one or more peripherals based on the one or more parameters or the value stored in the secure register.

20 Claims, 9 Drawing Sheets

400

402 Determine Whether A Requested Change To A Secure Register Is Authorized

404 Adjust A Value Stored In The Secure Register In Response To Determining That The Requested Change To The Secure Register Is Authorized 406 Determine, At The One Or More Peripherals, One Or More Parameters Of The One Or More Peripherals Based On The Value Stored In The Secure Register 408 Control A Functionality Of The One Or More Peripherals Based On The One Or More Parameters Or The Value Stored In The Secure Register

(56) References Cited

U.S. PATENT DOCUMENTS

| | | | |
|---|---|---|---|
| 2021/0264066 A1* | 8/2021 | Barzic | G06F 21/54 |
| 2022/0109617 A1* | 4/2022 | Lim | H04L 43/0852 |
| 2022/0292226 A1* | 9/2022 | Johnson | G06F 21/85 |
| 2024/0184735 A1* | 6/2024 | Kim | H04L 12/40104 |
| 2024/0289140 A1* | 8/2024 | Hamlin | G06F 9/44505 |

* cited by examiner

181

400

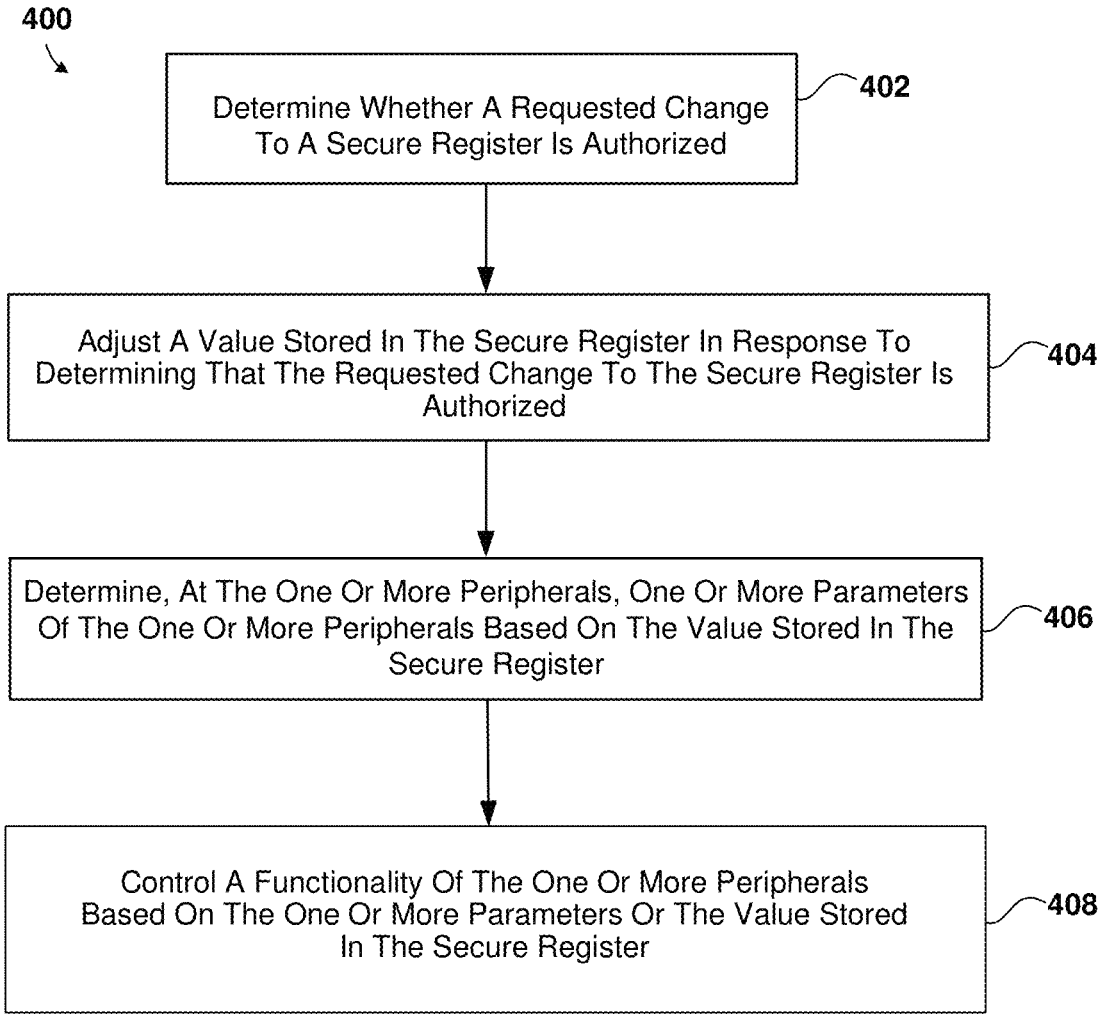

Determine Whether A Requested Change To A Secure Register Is Authorized ⌐402

Adjust A Value Stored In The Secure Register In Response To Determining That The Requested Change To The Secure Register Is Authorized ⌐404

Determine, At The One Or More Peripherals, One Or More Parameters Of The One Or More Peripherals Based On The Value Stored In The Secure Register ⌐406

Control A Functionality Of The One Or More Peripherals Based On The One Or More Parameters Or The Value Stored In The Secure Register ⌐408

HARDWARE-BASED CONTROL OF PERIPHERAL DEVICES

BACKGROUND

Extended reality is a growing technology and entertainment field that presents an alternate or overlay to reality via a user interface. Extended reality (XR) devices present several security and privacy concerns. These devices often rely on continuous data collection through cameras and microphones, which can lead to unauthorized recording and surveillance. The potential risks from hacking is significant, as malicious actors could gain access to personal data, live feeds, or even control the device, leading to privacy breaches. Additionally, the integration of XR and smart glasses with various apps and services may result in data sharing without user consent, exposing sensitive information.

SUMMARY

Various aspects include systems and methods for controlling one or more peripherals of a computing device, such as an extended reality (XR) device. Various aspect may include determining whether a requested change to a secure register is authorized, adjusting a value stored in the secure register in response to determining that the requested change to the secure register is authorized, determining, at the one or more peripherals, one or more parameters of the one or more peripherals based on the value stored in the secure register, and controlling a functionality of the one or more peripherals based on the one or more parameters or the value stored in the secure register. In some aspects, controlling the functionality of the one or more peripherals may include enabling or disabling the one or more peripherals. Such aspects may further include verifying, at a startup of the computing device or the one or more peripherals, whether a peripheral is enabled or disabled based on the secure register. In some aspects, the secure register may be disposed on one of the one or more peripherals. In some aspects, the secure register(s) may be disposed outside the one or more peripherals and on the computing device.

Some aspects may further include adjusting a configuration value stored in one or more configuration registers in response to determining that the requested change to the one or more configuration registers is authorized, and adjusting a functionality of the one or more peripherals based on the configuration value stored in one or more configuration registers. In some aspects, the secure registers may include configuration registers and peripheral control registers. In some aspects, the functionality may include at least one of a display mode, a resolution, a frames per second, as single core mode, multi-core mode, direct memory access enabled/disabled, one or more clock speeds, resolution capture size, compression rates and access to other post-processing hardware blocks, or scan rates.

In some aspects, determining whether the requested change to a secure register is authorized may be performed by an extensible protection unit that controls access to the secure registers, and where access to the secure registers may be controlled for multiple entities including at least one of: users, applications, original equipment manufacturers, or other clients of the computing device. In some aspects, access to the secure registers may be controlled for the multiple entities based on a shared mask value stored in an access register, in which each entity or group of entities is assigned a position or value in the shared mask. In some aspects, access control by the extensible protection unit may control whether an entity of the multiple entities is permitted to modify settings of the one or more peripherals via additional registers.

Further aspects include an XR device having a processor configured to perform one or more operations of any of the methods summarized above. Further aspects include processing devices for use in a user device configured with processor-executable instructions to perform operations of any of the methods summarized above. Further aspects include a non-transitory processor-readable storage medium having stored thereon processor-executable instructions configured to cause a processor of a user device to perform operations of any of the methods summarized above. Further aspects include a user device having means for performing functions of any of the methods summarized above. Further aspects include a system on chip for use in a user device and that includes a processor configured to perform one or more operations of any of the methods summarized above.

BRIEF DESCRIPTION OF THE DRAWINGS

The accompanying drawings, which are incorporated herein and constitute part of this specification, illustrate example embodiments of various embodiments, and together with the general description given above and the detailed description given below, serve to explain the features of the claims.

FIG. 4 is a process diagram illustrating an example method suitable for implementing various embodiments.

DETAILED DESCRIPTION

Figure 1A:
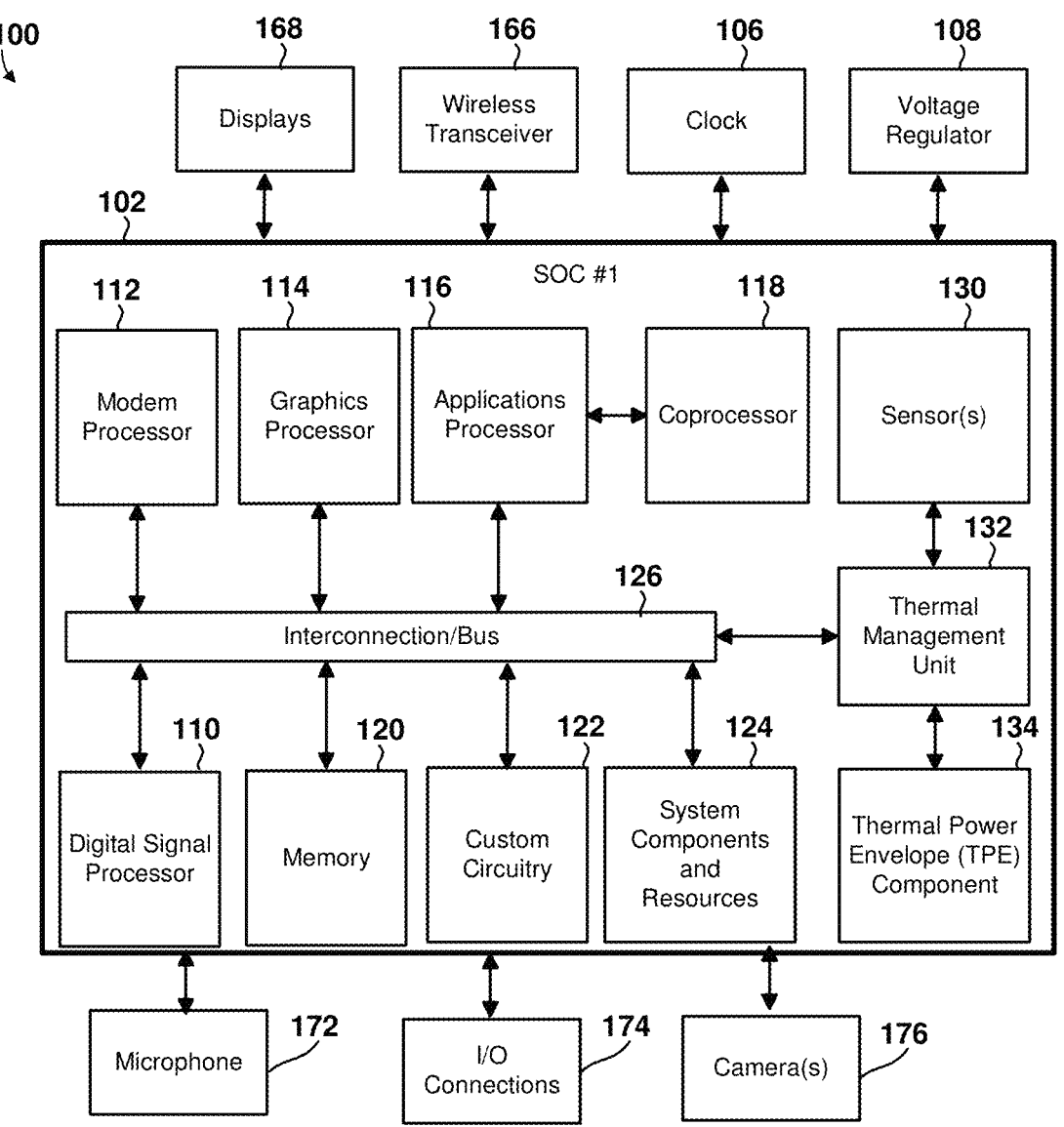
FIG. 1A is a system diagram illustrating an example system suitable for implementing various embodiments.

Various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the claims.

Various embodiments provide methods and mechanisms for preventing peripheral devices from leaking information or being operated by unauthorized users. In various embodiments, a processing device may include a secure/protected execution environment (e.g., a trust zone), an extensible protection unit, and at least two timer control registers controlled and access-gated by the extensible protection unit that are configured to enable or disable peripherals and to designate users authorized to modify at least two peripheral control registers. Executable logic within each peripheral may be configured to check a given register upon startup to determine whether the peripheral is enabled or disabled. Additional registers (i.e., configuration registers) may be configured to control settings for each peripheral. As non-limiting examples, some settings for which access is controlled by one or more configuration registers include a display mode, a resolution, a frames per second (FPS) setting, single core mode, multi-core mode, direct memory access enabled/disabled, one or more clock speeds, resolution capture size, compression rates and access to other post-processing hardware blocks, or scan rates. For example, processor functionality may be controlled via controllable settings or modes, such as single core, multi-core, DMA enabled/disabled, or various clock speed settings. In another example, a camera hardware block may be controlled by configuration registers for hardware settings, such as resolution capture size, compression rates and access to other post-processing hardware blocks, scan rates, and other capture settings for cameras. The peripheral control registers may include registers recording ownership permissions via a mask to control or configure the peripherals. Configuring peripheral control registers in this manner may increase design and application configuration flexibility in assigning permissions to user groups, applications, OEMs, or other clients.

As user devices become able to collect increasing amounts of data, including camera feeds, such user devices need secure control mechanisms to turn off such functionality in certain settings, applications, or environments (e.g., bathrooms). Further, some applications may limit the functionality of hardware components of the user device in order to provide a standard quality of service (QOS) for the user (e.g., reduced resolution). Simply implementing such functionality limitations at the software or operating system (OS) level requires that the hardware still operate at full capacity (e.g., highest resolution) and may require additional resources to down-convert to the required limit.

In firmware or hardware design, shared access controls pose significant hardware-specific challenges when multiple user types are involved. Firmware typically operates at a low level, interacting closely with the hardware components of a user device. When multiple entities, such as original manufacturer (OEM), applications, and the operating systems, need a way to control hardware resources, implementing secure and efficient access controls for this hardware becomes complex. One issue is that different types of entities requiring access to peripherals or data produced by peripherals often have different origination points and different starting levels of trust in the system. This makes it difficult to implement robust access control mechanisms at the hardware level (e.g., check bits or certificates). Even if the software can handle authorization, the hardware may not be configured to directly interact in this manner. Improper access controls can lead to risks of unauthorized access to critical hardware functionalities, such as the ability to modify system configurations, access secure data, or manipulate hardware behavior.

The systems and methods disclosed in this application address these issues by using the trusted zone of a central processing unit (CPU) or system on a chip (SoC) as the basis for authentication and authorization of entities attempting to access control registers that are configured to store settings for hardware components, such as peripheral devices. For example, an operating system (OS) may need to disable a component because no suitable driver was found for the component. In this case, the OS may authenticate a write request to the hardware control registers at a trust zone authenticator or an extensible protection unit (XPU) within the trust zone (TZ). Once authorized, the write request may be passed on to the peripheral control registers by the XPU to flip a bit that disables the driverless component. The component may be configured to check the peripheral control registers at a predetermined time to determine its access status (e.g., at startup or first access). When someone or something attempts to access this driverless component, the device will be unable to do so until the peripheral control register is changed by an authorized entity, such as the authorized user of the computing device.

In some embodiments, the computing device may be configured to perform a method for controlling access to peripherals of a central device, in which the central device may have a trusted zone of authenticated hardware or firmware and an operating system. The trusted zone may have an XPU that controls access to peripheral control registers (e.g., timer control registers) that may define whether a peripheral is enabled or disabled and define what users may modify these registers. Each peripheral may be enabled or disabled and may include logic that is configured to check, on startup, whether the peripheral is enabled or disabled. Additional registers (configuration registers) may also be included that control settings for each of the peripherals; for example but not limited to, a display mode, a resolution, a frames per second (FPS) setting, single core mode, multi-core mode, direct memory access enabled/disabled, one or more clock speeds, resolution capture size, compression rates and access to other post-processing hardware blocks, or scan rates. The addition of the access control registers to define which users or clients can control a peripheral may increase flexibility with regard to the types of entities that can access including users, applications, OEMs, or other clients. Further, this permissions arrangement allows users to be grouped with applications or manufacturers as individual owners that can be individually or collectively given permission to control or configure a peripheral in a way that is secured from malicious software.

In various embodiments, the configuration registers may store configuration values specific to individual peripherals (e.g., display mode resolution), with each entity having a unique position/value in the shared mask value. For instance, an OEM may have full access rights to modify all registers for their branded devices, whereas users or applications would be allowed write/modify access only to some of these stored configuration values.

In various embodiments, multiple entities may share permissions through hierarchical structures (e.g., role-based access control), attribute-based access control (ABAC) using hardware source identifiers or software application signing, or through trusted certificates for authentication and authorization. An XPU may resolve conflicts between authorized parties by prioritizing predefined rules for resolving disputes based on entity type, user roles, or other factors. In this manner, fine-grained control over peripheral settings and permission structures may be achieved through multiple secure registers with different ownership masks.

An XPU may be utilized in various embodiments for determining peripheral parameters to manage access controls for various types of peripherals connected to a computing device, including display-related devices, input/output devices like keyboard and mouse, storage devices like hard drive solid-state drives, and network interfaces such as Wi-Fi and Ethernet.

The term "user equipment" (UE) is used herein to refer to any one or all of wireless communication devices, wireless appliances, cellular telephones, smartphones, portable computing devices, personal or mobile multi-media players, laptop computers, tablet computers, smartbooks, ultrabooks, palmtop computers, wireless electronic mail receivers, virtual reality displays, extended reality displays, multimedia Internet-enabled cellular telephones, wireless router devices, medical devices and equipment, biometric sensors/devices, wearable devices including smart watches, smart clothing, smart glasses, smart wrist bands, smart jewelry (for example, smart rings and smart bracelets), entertainment devices (for example, wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, wireless devices affixed to or incorporated into various mobile platforms, global positioning system devices, and similar electronic devices that include a memory, peripheral components, and a programmable processor or processor system.

The term "system on chip" (SOC) is used herein to refer to a single integrated circuit (IC) chip that contains multiple resources or processors integrated on a single substrate. A single SOC may contain circuitry for digital, analog, mixed-signal, and radio-frequency functions. A single SOC also may include any number of general purpose or specialized processors (digital signal processors, modem processors, video processors, etc.), memory blocks (such as ROM, RAM, Flash, etc.), and resources (such as timers, voltage regulators, oscillators, etc.). SOCs also may include software for controlling the integrated resources and processors, as well as for controlling peripheral devices.

The term "system in a package" (SIP) may be used herein to refer to a single module or package that contains multiple resources, computational units, cores or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SOCs coupled together via high-speed communication circuitry and packaged in close proximity, such as on a single motherboard or in a single wireless device. The proximity of the SOCs facilitates high speed communications and the sharing of memory and resources.

As used herein, the term "processing system" is used herein to refer to one more processors, including multi-core processors, that are organized and configured to perform various computing functions. Various embodiment methods may be implemented in one or more of multiple processors within a vehicle processing system as described herein.

Augmented reality (AR) or extended reality (XR) promises to be the next frontier of media by adding, extending, or overlaying additional features into the real world we sense around us. AR and XR media may primarily be audiovisual and include textual overlays but in many AR and XR system configurations the user interface requires physical input. In some implementations, a portable user device providing an extended reality experience may be AR and XR glasses or goggles that include a display positioned in front of the user's eyes so as to overlay images and information over the real world. For example, AR and XR glasses or goggles are wearable and the term "wearable device" is used herein to refer generally to devices implementing various embodiments. Further, the term "AR glasses" will be used in the following descriptions as a representative example of wearable devices for viewing AR and XR media and is intended to encompass AR glasses, XR glasses, AR goggles, XR goggles, virtual reality (VR) googles and similar wearable devices.

In some implementations, AR/XR/VR viewing devices, such as AR glasses, work in conjunction with a bridge communication device (referred to herein as a "bridge device"), such as a smartphone, tablet computer, personal computer, which are referred to herein as user equipment (UE). In such implementations, the bridge device or UE may serve as a communication hub for receiving AR/XR/VR media from a remote server or edge server, such as via a 5G communication link, and relaying the media data to the AR glasses via a local wireless communication link, such as Wi-Fi or Bluetooth. The bridge device may connect to other devices for inputs and outputs (e.g., surround sound speakers).

AR glasses may project or display one or more graphics on lenses through which the user can also see the real-world, and as well as emit sounds from the frame or temples that the user can hear. The AR glasses may also allow the user to see through the lenses to the real world at the same time as graphics are displayed on the lenses. In many AR and XR applications, the augmented media (images, text and/or sounds) may be streamed to a bridge device or UE (e.g., a smart phone) and/or directly to AR glasses from an external server and/or an edge server. The audiovisual media that is presented on lenses of AR glasses may be generated at the AR glasses and/or UE, or generated, at least in part, at remote servers. The user experience may be delivered by a shared extended reality application that is hosted on one or more external servers and/or edge servers and on the user device.

Because AR and XR media are added to the user experience as a part of the real world, the generation and rendering of this media necessarily includes the need to consider real-time aspects, such as the user's gaze as well images of the real world as seen by the user. In order to appropriately align the AR and XR display graphics with the real world seen through the lenses, the AR glasses may monitor the pose, orientation, eye direction, and movement of the user and transmit that information to an external server and/or edge server that is streaming AR and XR media content for rendering on the AR glasses. In some embodiments, the AR glasses may include one or more cameras that image the real world, with such imagery uploaded to the external server and/or edge server for use in identifying appropriate AR and XR media to be downloaded to the UE and/or AR glasses. Likewise, XR may utilize sensor data, pose information, and camera views of the user or from the viewpoint of the user in order to provide a completely virtual but interactive experience.

As a result, these XR devices may rely on continuous data collection through cameras and microphones, which can lead to unauthorized recording and surveillance. The potential for hacking is significant, as malicious actors could gain access to personal data, live feeds, or even control the device, leading to privacy breaches. Additionally, the integration of XR devices with various apps and services may result in data sharing without user consent, exposing sensitive information. Further, the sheer volume of data collected by XR devices, including visual and audio inputs from the user's environment, can create a detailed profile of the user's habits, preferences, and movements, which could be exploited by malicious parties. The interconnected nature of these devices with other smart technologies (e.g., smart-phones) also increases the attack surface, providing more opportunities for cybercriminals to infiltrate systems and compromise privacy. Consequently, without robust authen-tication measures and secured hardware, XR devices could become a significant vector for data breaches and unauthor-ized surveillance, thereby undermining user trust and safety.

In various embodiments, when an authorized entity sub-mits a write request to adjust one or multiple secure registers related to peripherals connected to the computing device, such as display resolution settings or network interface configurations, the extensible protection unit (XPU) may verify whether the requesting party has been granted per-mission by checking its position/index within a shared mask value stored in another access control register.

Various embodiments improve the security of computing devices and data collected by peripheral components within or connected to the computing device by providing secure and effective mechanisms for preventing access to the peripheral components and/or their data. Further, various embodiments provide hardware and application developers with flexible mechanisms for restricting entities and users that are able to make changes to access permissions and peripheral access modes, thereby increasing computing device security without impacting the user experience or complicating hardware, firmware, and software develop-ment.

FIG. 1A is a component block diagram illustrating an example computing and wireless modem system 100 suit-able for implementing any of the various embodiments. Various embodiments may be implemented on a number of single processor and multiprocessor computer systems, including a system-on-chip (SOC) or system in a package (SIP).

With reference to FIGS. 1A, the illustrated example computing system 100 (which may be a SIP in some embodiments) includes a SOC 102 coupled to a clock 106, a voltage regulator 108, a wireless transceiver 166 config-ured to send and receive wireless communications via an antenna (not shown) to/from a UE or a network device, and displays 168. In some embodiments, the SOC 102 may operate as central processing unit (CPU) of an XR device or user computer that carries out the instructions of software application programs by performing the arithmetic, logical, control and input/output (I/O) operations specified by the instructions.

The SOC 102 may include a digital signal processor (DSP) 110, a modem processor 112, a graphics processor 114, an application processor 116, one or more coprocessors 118 (such as vector co-processor) connected to one or more of the processors, memory 120, custom circuitry 122, sys-tem components and resources 124, an interconnection bus module 126, one or more temperature sensors 130, a thermal management unit 132, and a thermal power envelope (TPE) component 134.

Each processor 110, 112, 114, 116, 118, 152, 160 may include one or more cores and one or more temperature sensors, and each processor or processor core may perform operations independent of the other processors or processor cores. For example, the SOC 102 may include a processor that executes a first type of operating system (such as FreeBSD, LINUX, OS X, etc.) and a processor that executes a second type of operating system (such as MICROSOFT WINDOWS 10). In addition, any or all of the processors 110, 112, 114, 116, 118, 152, 160 may be included as part of a processor cluster architecture (such as a synchronous processor cluster architecture, an asynchronous or hetero-geneous processor cluster architecture, etc.).

The SOC 102 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 124 of the SOC 102 may include power amplifiers, voltage regulators, oscilla-tors, phase-locked loops, peripheral bridges, data control-lers, memory controllers, system controllers, access ports, timers, and other similar components used to support the processors and software clients running on a core device. The system components and resources 124 and/or custom circuitry 122 also may include circuitry to interface with peripheral devices, such as cameras, electronic displays, wireless communication devices, external memory chips, etc.

The various processors 110, 112, 114, 116, 118 of the SoC 102 may be interconnected to one or more memory elements 120, system components and resources 124, and custom circuitry 122, and a thermal management unit 132 via an interconnection bus module 126. The interconnection bus module 126 may include an array of reconfigurable logic gates and/or implement a bus architecture (such as Core-Connect, AMBA, etc.). Communications may be provided by advanced interconnects, such as high-performance net-works-on chip (NoCs).

The SOC 102 may further include an input/output con-nections 174 for communicating with resources external to the SOC, such as a clock 106 and a voltage regulator 108. Resources external to the SOC (such as clock 106, voltage regulator 108) may be shared by two or more of the internal SOC processors or processor cores. In addition to the example SIP 100 discussed above, various embodiments may be implemented in a wide variety of computing sys-tems, which may include a single processor, multiple pro-cessors, multicore processors, or any combination thereof.

The SoC 102 may connect to peripherals such as microphone 172, I/O connections 174, displays 168, and camera(s) 176. In some cases, the user may want to disable the microphone 172 and cameras 176 in a more secure manner than just shutting off an application that is using them. For example, the user may want a hardware switch that ensures other software cannot access these peripherals (microphone 172 and cameras 176). As described below, these peripherals (and any others in FIG. 1A) may be configured with machine executable instructions that check one or more secure registers to determine if the peripheral is enabled or disabled, or if particular functionality is disabled/enabled.

The I/O connections 174 of system 100 may provide connection ports for SoC 102 including universal serial bus (USB) ports, High-Definition Multimedia Interface (HDMI) ports, Peripheral Component Interconnect Express (PCIe) ports, Serial Peripheral Interface (SPI) ports, and other connection ports. A user or an equipment owner (e.g., enterprise company) may want one or more of these ports provided by the system 100 to be disabled for security reasons (e.g., prevent malicious software). Accordingly, this I/O connections module 174 may be configured with machine executable instructions that check one or more secure registers to determine if one or more of the ports/connections is enabled or disabled.

Figure 1B:
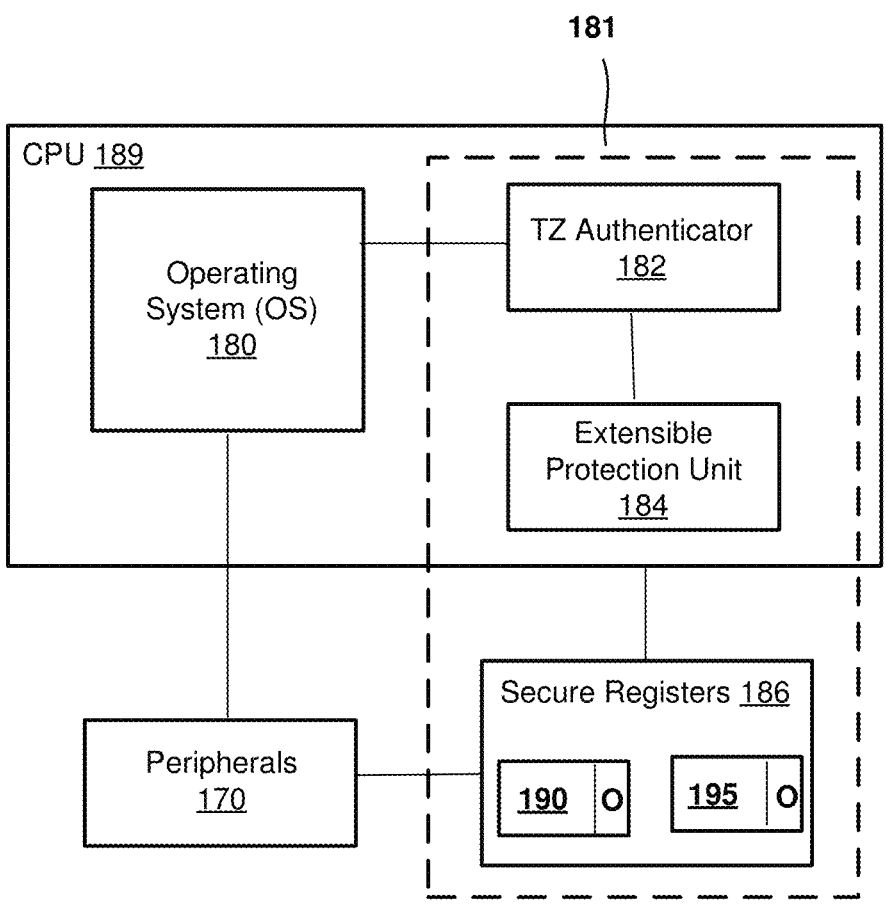
FIG. 1B is a system diagram illustrating an example system architecture suitable for implementing various embodiments.

FIG. 1B is a system diagram illustrating an example system including connections between various components of the system that enable communication. With reference to FIGS. 1A-1B, a CPU 189 may be a core processor or an SoC of a central device, which may connect to peripherals 170 which may be in the central device or remote from the central device. The CPU 189 may include an operating system 180 executing on it for hosting one or more applications and communicating with peripherals 170.

The CPU 189 may include a trust zone (TZ) authenticator 182 and an extensible protection unit 184 which both may be disposed inside a trust zone 181. The trust zone is a block of hardware, firmware, and software components that have been checked for integrity by a bootloader, which establishes a root of trust during startup. The root of trust may verify other keys and certificates, which then may be used to confirm the integrity of hardware and software components. For example, FIG. 1B shows secure registers 186, the extensible protection unit 184, and the TZ authenticator 182 are within the trust zone 181. So configured, the CPU 189 is able to confirm the integrity of these components.

When an application executing on the CPU 189 attempts to access a peripheral 170, the peripheral may receive the request and check one of the peripheral control registers 190, which may be an enable/disable register, to determine the status of the peripheral. The peripheral may then respond to the request for access with an acknowledgement or with a notification that the peripheral is disabled.

For each peripheral or for each enable/disable register or group of such registers, the secure registers 186 may also assign an ownership register (O) that may store a mask value indicating which owners from a list of owners have access to enable/disable. In other words, a dedicated register may record read and write permissions for a variety of entities including device users, applications, and hardware components.

The secure registers 186 may include configuration registers 195, which may correspond to one or more of the peripherals 170 and may store configuration settings for one or more of the peripherals 170. For example, a configuration register 195 may store a variable (e.g., binary 0 or 1) that indicates a resolution setting for a camera of peripherals 170. The configuration registers 195 may be configured to limit the functionality or change the functionality of one or more peripherals 170 with one or more writable settings for a peripheral. Each peripheral that is configured to have settings securely recorded in the configuration registers 195 may include logic that checks these settings on startup or when accessed.

The secure registers 186, including the one or more peripheral control registers 190 and the one or more configuration registers 195, may have corresponding access control registers or owner registers (O) that record which entities have write permissions. These owner registers (O) may store a mask variable that records in binary the combination of entities, within a list of known entities, that have access and do not have access and/or write permissions. The known entities may be assigned positions in the mask by the XPU 184.

A mask variable may be a binary construct used to record and manage access permissions for a set of users efficiently. Each bit in the mask variable may represent a specific permission (i.e., authorized or not authorized for X action), and its position in the mask may correspond to a particular user or a group of users. For example, in a system in which different permissions are represented by different bits in a binary string, each bit position (from least significant to most significant) may indicate whether a particular permission is granted (bit set to 1) or denied (bit set to 0). In such a system, a mask variable can be used to consolidate multiple permissions into a single value. For instance, if the first bit represents read access, the second bit represents write access, and the third bit represents execute access, a mask variable with a value of 5 (binary 101) would indicate that read and execute permissions are granted, while write permission is denied.

When managing permissions for multiple users or entities, the XPU 184 may use or access an array or a list of mask variables, in which each mask corresponds to a different user or role. By performing bitwise operations, such as AND, OR, and NOT, the XPU can efficiently check, grant, or revoke specific permissions. For example, to check whether a particular user has write access, the XPU 184 may perform a bitwise AND operation between the user's mask and the write permission bitmask. If the result is non-zero, this indicates to the XPU that the user has the permission; otherwise, the user does not. This approach reduces the overhead associated with more complex permission management schemes and allows the XPU 184 to manage access control lists for a variety of entities including hardware components, software applications, and users. In some implementations, the XPU 184 may perform the checking operations for a particular request after reading the owner register (O) for a particular secure register 186 (e.g., 190, 195).

In some embodiments, the secure registers 186 may store configuration settings in various data formats, such as numerical values (e.g., resolution), Boolean flags (e.g., enable/disable), strings (display mode names), and integers with specific ranges and units. The XPU 184 may ensure that only authorized entities may modify these stored configurations by verifying their permissions through a combination of the shared mask value, position/index in this mask, or other access control mechanisms. In an optional idle mode, the XPU 184 may permit changes to the configuration registers 195 without authentication or authorization and may require authentication for access to the peripheral control registers 190.

Figure 1C:
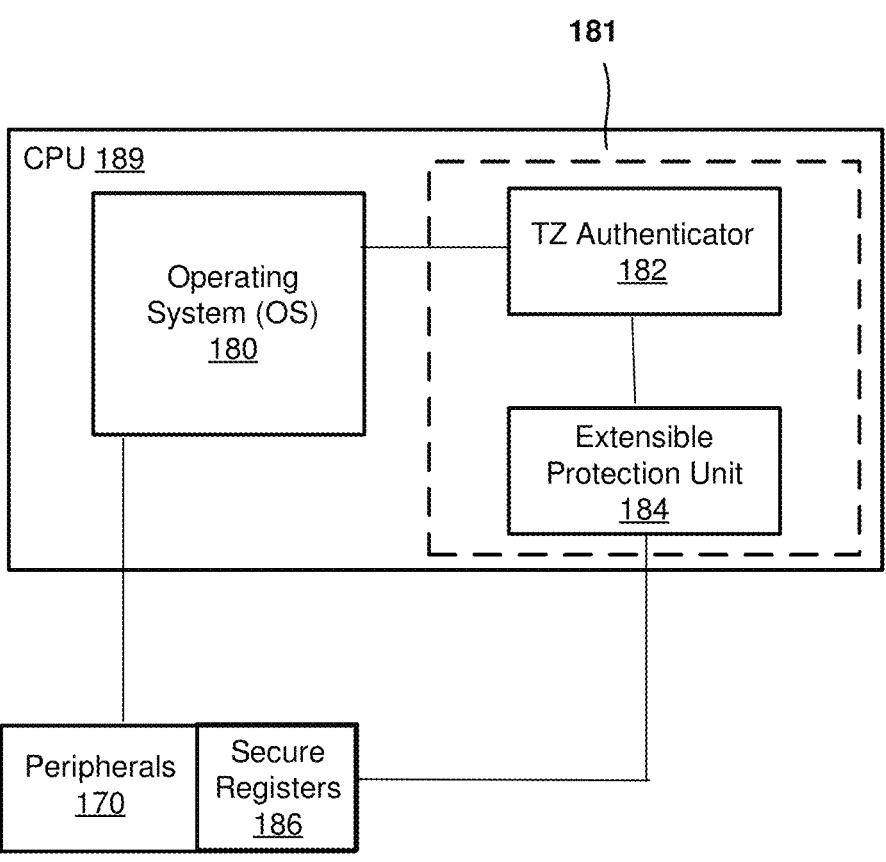
FIG. 1C is a system diagram illustrating an example system architecture suitable for implementing various embodiments.

FIG. 1C is a system diagram illustrating an example system including connections between various components that enable communications. With reference to FIGS. 1A-1C, only the differences between FIGS. 1B and 1C are described here.

In the implementation illustrated in FIG. 1C, the secure registers 186 are disposed in the corresponding peripherals 170. That is, the configuration registers 195 and the peripheral control registers 190 (and their respective owner registers (O)) for a particular peripheral 170 may be integrated into memory registers within the peripheral 170. In some embodiments, a peripheral device may include multiple secure registers 186 for storing different types of data related to its operation (e.g., enable/disable, state, or configurations). Each register may be configured with specific permissions using an ownership mask value stored in another access or ownership register (O), allowing entities, like users, applications, OEMs, and other clients, to have varying levels of authorization.

For example, the configuration register 195 for setting the resolution of a camera may be integrated as part of the camera hardware components. When the secure registers 186 are implemented at or in the peripherals 170, the peripherals 170 may access or read the secure registers 186 without passing a request (e.g., a status check request) into the trust zone 181. Write requests or requests to change the secure registers 186 may be controlled by the XPU 184 and, therefore, secured by TZ authenticator 182 and XPU 184 from malicious alteration. Secure registers 186 may be implemented in a separate register component, in registers at the peripheral 170, or in a combination thereof (e.g., for different peripherals).

In some embodiments, an interrupt-driven mechanism may be used by the peripherals for immediate updates upon the change of a value in the secure registers 186 without requiring a restart/reboot of the computing device. The computing device may cache configuration values and notify the peripheral devices about changes made in real-time. In some embodiments, upon startup or first access to a specific resource (e.g., display mode resolution), peripherals may execute additional checks for any pending updates from secure registers 186 before enabling their functionality. This ensures that changes made by authorized entities are propagated correctly and consistently across all connected devices.

Figure 2:
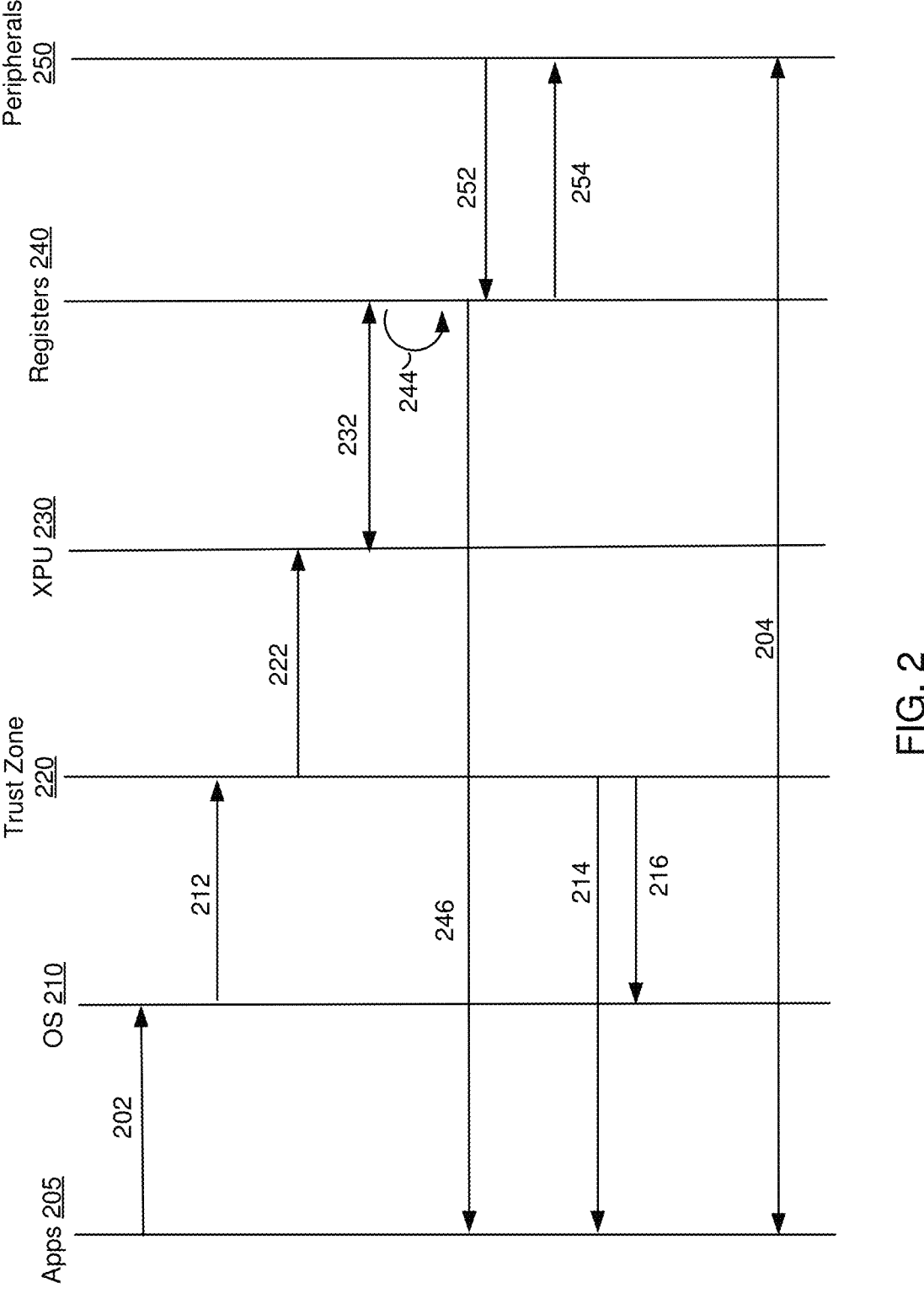
FIG. 2 is an illustration of a timing diagram of an example system according to various embodiments.

FIG. 2 is a message flow diagram of an example system according to various embodiments. With reference to FIGS. 1A-2, the applications (Apps) 205 may initiate a write request for a secure register 240 of a peripheral 250 (e.g., peripheral 170). The write request to the secure registers 240 may be passed to the operating system (OS) 210 via a request communication 202, which may communicate the request to XPU 230 via communications 212, 222. The XPU 230 may exchange request communications 232 with an owner register corresponding to the register (e.g., secure registers 240) for which write permission is being requested. The XPU 230 may compare the requesting application 205 (or its identity or certificate) with an owner list and with the owner mask stored in the owner register of the peripheral register being written to by the application. If the owner mask indicates that the application 205 has permission to write to the secure register 240 for the peripheral, then the XPU 230 will authorize or perform the write to the secure register 240 (i.e., write the requested value into the register) in operation 244. The XPU 230 may then acknowledge the successful write in a communication message 246 back to application 205. If the application 205 does not have permission to write to the secure register 240, the XPU 230 may respond to the application 205 that permission is denied in the communication message 246.

Application 205 may request permission to write or read the secure registers 240 (e.g., secure registers 186) via a request communication 202 and the OS 210 may forward the request as communication 212 as described above. The trust zone 220 or a trust zone authenticator 182 may determine that the application 205 is not to be trusted or is not properly authenticated (e.g., is bypassing proper OS channels). The application 205 may be informed by a message 214 that the application is not trusted or the request cannot be performed. The OS 210 may also be informed of the denial of the access of application 205 by the trust zone 220 in message 216.

The application 205 may request permission to access a peripheral or may request that the peripheral turn on or share information in communication 204. The peripheral device 250 may then request permission to read the secure registers 240 to determine its status (e.g., enabled/disabled) in message 252. The peripheral device 250 status may be returned to the peripheral in message 254. The peripheral status or a response to the application request (e.g., if the peripheral is enabled) may be returned to the application 205 in a communication 204. The application 205 may also write to configuration registers of secure registers 240 via the chain of requests 202, 212, 222, and 232. Likewise, a peripheral 250 may check configuration settings in configuration registers of secure registers 240 via messages 252 and 254. If configuration settings prevent an action, the peripheral 250 may report the settings to the application 205 via communication 204.

Figure 3:
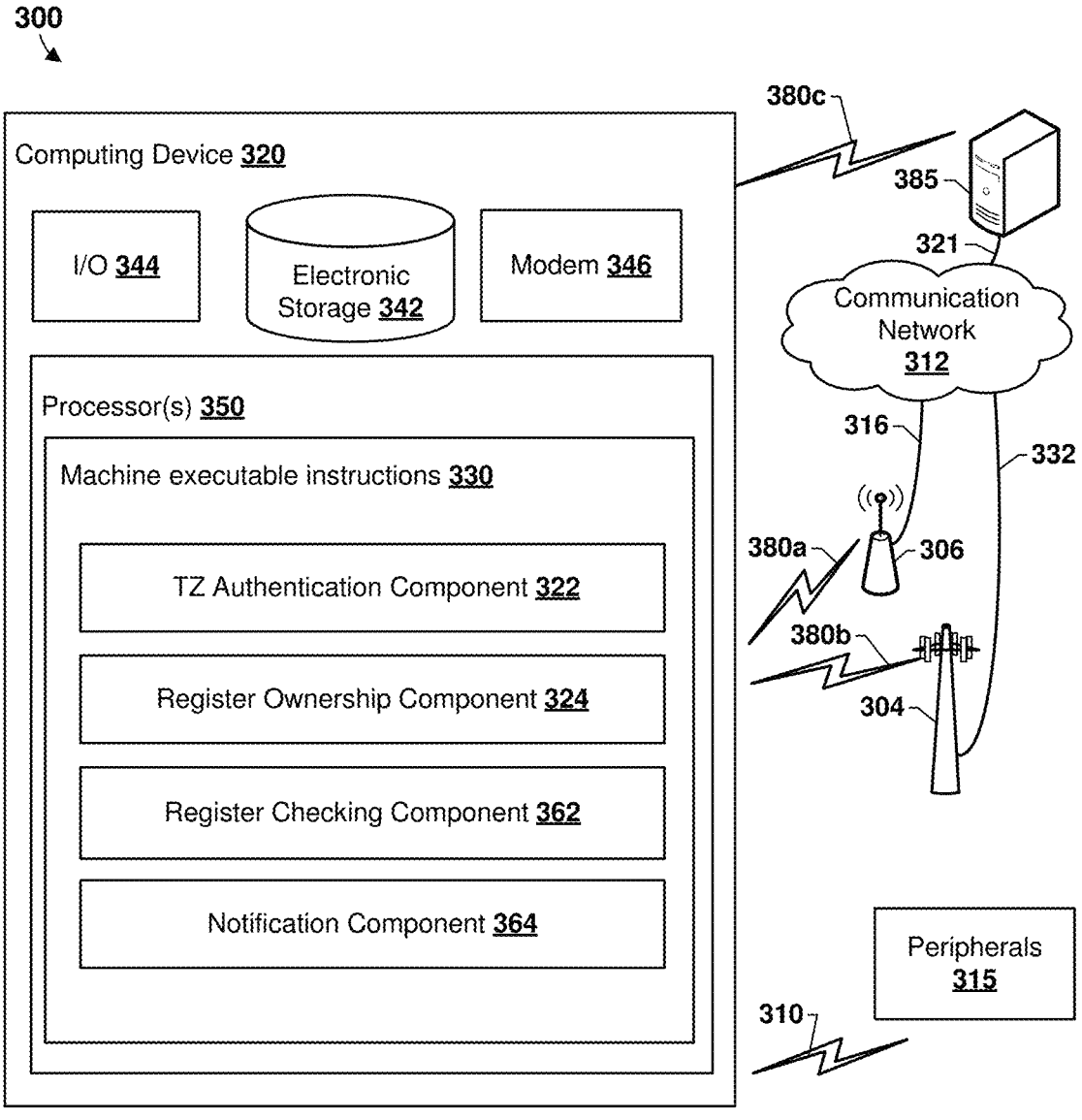
FIG. 3 is a system block diagram illustrating an example system suitable for implementing various embodiments.

FIG. 3 is a system block diagram illustrating an example system suitable for implementing the method of various embodiments. With reference to FIGS. 1A-3, the system 300 may include peripherals 315 configured to communicate with computing device 320 via a local wireless connection 310 (e.g., Wi-Fi, NFC, Bluetooth). The computing device 320 may also be embedded with peripherals in a device and connect via a wired connection. The computing device 320 may also be configured to communicate with external resources (e.g., server 385) via a wireless connection 380a, 380b, 380c to a wireless communication network 312, such as a cellular wireless communication network. Wireless connection 380a may be a radio link to picocell 306, which may connect via backhaul or midhaul 316 to communication network 312. Wireless connection 380b may be a radio link to gNB 304, which may connect via backhaul or midhaul 332 to communication network 312. The communication network 312 may connect to server 385 via link 321 (e.g., fiber).

The computing device 320 may include one or more processor(s) 350, electronic storage 342, I/O 344, a modem 346 (e.g., wireless transceiver), and other components. The computing device 320 may include communication lines or ports to enable the exchange of information with a network and/or other computing platforms. Illustration of the computing device 320 in FIG. 3 is not intended to be limiting. The computing device 320 may include a plurality of hardware, software, and/or firmware components operating together to provide the functionality of the computing device 320 in various embodiments.

Electronic storage 342 may include non-transitory storage media that electronically stores information. The electronic storage media of electronic storage 342 may include one or both of system storage that is provided integrally (i.e., substantially non-removable) with the computing device 320 and/or removable storage that is removably connectable to the computing device 320 via, for example, a port (e.g., a universal serial bus (USB) port, a firewire port, etc.) or a drive (e.g., a disk drive, etc.). Electronic storage 342 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 342 may include one or more virtual storage resources (e.g., cloud storage, a virtual private network, and/or other virtual storage resources). Electronic storage 342 may store software algorithms, information determined by processor(s) 350, information received from the computing device 320 or peripherals 315, information received from the server 385, and/or other information that enables the computing device 320 to function as described herein.

The processor(s) 350 may include one or more local processors, which may be configured to provide information processing capabilities in the computing device 320 (or peripherals 315). As such, the processor(s) 350 may include one or more of a digital processor, an analog processor, a digital circuit designed to process information, an analog circuit designed to process information, a state machine, and/or other mechanisms for electronically processing information. Although the processor(s) 350 is shown in FIG. 3 as a single entity, this is for illustrative purposes only. In some embodiments, the processor(s) 350 may include a plurality of processing units. These processing units may be physically located within the same device, or the processor(s) 350 may represent the processing functionality of a plurality of devices operating in coordination.

The computing device 320 may be configured by machine-executable instructions 330, which may include one or more instruction modules. The instruction modules may include computer program components. In particular, the instruction modules may include one or more of a TZ authentication component 322, a register ownership component 324, and/or other instruction modules. Together, these components (e.g., 322, 324) of a computing device 320 may provide secure storage of settings and functionality configurations for peripherals and may secure access to these secure registers (e.g., 186, 240) for only recognized owners.

The TZ authentication component 322 (e.g., TZ authenticator 182) may be a trusted component in the trust zone of an SoC or computing device (e.g., 320), such that on startup, the TZ authentication component 322 may be authenticated from a root of trust. The TZ authentication component 322 may receive messages and connection requests to any of the components within the trust zone and confirm that they come from a trusted source even if outside the trust zone. For example, the OS may send a request to enable/disable a peripheral by writing to one of the secure registers. This request may be sent along an authenticated channel that was previously established with the trust zone or the message may be signed by the OS. The TZ authentication component 322 may confirm the source of the message or request and may determine if that source can be trusted and/or authenticated. The computing device 320 may be configured to limit the authorized entities that can access the trust zone. Note that an entity (e.g., hardware component or software application) may be authorized to access the trust zone and still not authorized to access the secure registers (e.g., 186).

As a non-limiting example, the processor(s) 350 of the computing device 320 may interpret, on the processor(s) 350, requests for changes to peripherals 315 via the secure registers (e.g., in electronic storage 342). The peripherals 315 may connect to the computing device 320 via connection 310 and the computing device 320 may operate as a user device (e.g., XR device) that is configured to include secured configuration settings and hardware switches based on the secure registers.

The register ownership component 324 may include a list of known owners, including users, applications, remote clients, OEMs, hardware components, and entities authorized to access one or more secure registers. The register ownership component 324 may include a list of permissions that can be granted (e.g., read/write/execute). The register ownership component 324 may be configured to add or remove owners from the list of known owners in response to a particular authorizing certificate, for example. The list of known owners may be stored as a mask so that requesting entities can be matched with their corresponding mask values. As described above, the mask value for an owner may then be compared (e.g., bitwise) with values stored in an owner register (e.g., O) that corresponds to a secure register (e.g., 186, 240). The register ownership component 324 may be disposed in the trust zone and may be a part of the XPU (e.g., 184). The register ownership component 324 may be configured to manage various owner types, including users, software, network connections, and hardware. The register ownership component 324 may communicate with an XPU (e.g., 184), an OS (e.g., 210), or the requesting owner when a request's owner is confirmed or not confirmed to be on a list.

As a non-limiting example, the processor(s) 350 of the computing device 320 may interpret, on the processor(s) 350, requests for changes to peripherals 315 via the secure registers (e.g., in electronic storage 342). The peripherals 315 may connect to the computing device 320 via connection 310 and the computing device 320 may operate as a user device (e.g., XR device) that is configured to manage permissions for a variety of owner entities based on the secure registers.

The register management component 362 may receive inputs from the register ownership component 324 and directly from peripherals 315. The register management component 362 may receive notifications that an owner is confirmed. The register management component 362 may be a part of the XPU (e.g., 230). The register management component 362 may implement the authorized requests to change or write to the secure registers (e.g., 186, 240). For example, the register management component 362 may write to a configuration register for a camera changing the recorded aspect ratio as stored in that configuration register. The camera would be informed of the change or would check with the register management component 362 for the settings and status at startup. Peripherals 315 may be configured to periodically, intermittently, or upon a predetermined trigger (e.g., startup, first access) to check with the register management component 362 to retrieve settings and status corresponding to the peripheral. In some implementations, the register management component 362 may read the contents of the secure registers for entities that are not listed as owners (e.g., implement read-only mode).

As a non-limiting example, the processor(s) 350 of the computing device 320 may interpret requests for changes to peripherals 315 via the secure registers (e.g., in electronic storage 342). The peripherals 315 may connect to the computing device 320 via a connection 310, and the computing device 320 may operate as a user device (e.g., XR device) that is configured to include change secured configuration settings and hardware switches based on the secure registers.

The notification component 364 of the computing device 320 may perform communication operations for the XPU (e.g., 230), including notifying entities that are not authorized owners, notifying entities that a write has been successful or has not been successful, notifying a peripheral 315 of the status or settings assigned to it in the secure registers, and other notifications associated with the secure registers.

As a non-limiting example, the processor(s) 350 of the computing device 320 may interpret requests for changes to peripherals 315 via the secure registers (e.g., in electronic storage 342). The peripherals 315 may connect to the computing device 320 via connection 310 and the computing device 320 may operate as a user device (e.g., XR device) that is configured to include notifying a peripheral of a status or configuration based on the secure registers.

FIG. 4 is a process flow diagram illustrating an example method 400 suitable for implementing various embodiments. With reference to FIGS. 1A-4, the operations and events in blocks 402-408 of the method 400 may be performed or occur as described. The operations of the method 400 may be performed by the computing device 320, CPU 189, SoC 102, smart glasses 600, or one or more components thereof (e.g., machine-readable instructions 330, processor(s) 350). In some embodiments, the UE may include a processor (e.g., processor 189, 350) configured to perform the operations by processor-executable instructions stored in a non-transitory processor-readable medium (e.g., memory 320, 120). Means for performing the operations of the method 400 may be a processing system (e.g., 100, 300, 600) including one or more processors (e.g., 110, 112, 114, 116, 118, 122, 342, 350, etc.), a wireless transceiver (e.g., 346, 166), and other components described herein. To encompass any of the processor(s), hardware elements and software elements that may be involved in performing the method 400, the elements performing method operations are referred to as a "processing system" or a controller of secure registers for storing configurations and status states for peripherals.

In block 402, the processing system may determine whether a requested change to a secure register is authorized. An XPU that controls access to the secure registers may perform the process of determining whether a requested change to a secure register is authorized. Access to the secure registers may be controlled for multiple entities, including at least one of users, applications, original equipment manufacturers (OEMs), or other clients of the computing device. Access to the secure registers (e.g., 186, 240) may be controlled for the multiple entities based on a shared mask value stored in an access register, in which each entity or group of entities is assigned a position or value in the shared mask. A different mask may be provided for each of the one or more peripherals. Access control by the XPU unit may control whether an entity of the multiple entities is permitted to modify settings of the one or more peripherals via additional registers (e.g., access control or ownership registers).

In block 404, the processing system may adjust a value stored in the secure register (e.g., 186) in response to determining that the requested change to the secure register is authorized. The value may correspond to a configuration setting or an operating status of a peripheral device.

In block 406, the processing system may determine, at the one or more peripherals, one or more parameters of the one or more peripherals based on the value stored in the secure register (e.g., 195). In other words, the peripheral may determine that the value stored corresponds to a parameter in its own configuration. This determination may be performed in response to a trigger event or on startup of the processing system.

In block 408, the processing system may control a functionality of the one or more peripherals based on the one or more parameters or the value stored in the secure register (e.g., 186). Controlling the functionality of the peripheral device may include enabling or disabling the one or more peripherals. The secure register (e.g., 186) may be disposed on one of the one or more peripherals. The secure register (e.g., 186) may be disposed outside the one or more peripherals and in the processing system.

Figure 5A:
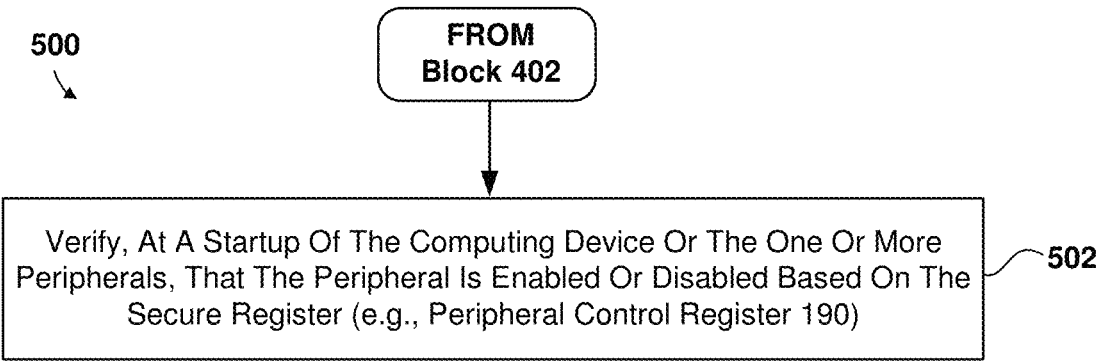
FIG. 5A is a process diagram illustrating an example method suitable for implementing various embodiments.

FIG. 5A is a process diagram illustrating an example method 500 suitable for implementing various embodiments. With reference to FIGS. 1A-5A, the operations and events in block 502 of the method 500 may be performed or occur as described. The operations of the method 500 may be performed by the computing device 320, CPU 189, SoC 102, smart glasses 600, or one or more components thereof (e.g., machine-readable instructions 330, processor(s) 350). In some embodiments, the UE may include a processor (e.g., processor 189, 350) configured to perform the operations by processor-executable instructions stored in a non-transitory processor-readable medium (e.g., memory 320, 120). Means for performing the operations of the method 500 may be a processing system (e.g., 100, 300, 600) including one or more processors (e.g., 110, 112, 114, 116, 118, 122, 342, 350, etc.), a wireless transceiver (e.g., 346, 166), and other components described herein. To encompass any of the processor(s), hardware elements and software elements that may be involved in performing the method 500, the elements performing method operations are referred to as a "processing system" or a controller of secure registers for storing configurations and status states for peripherals.

In block 502, which may continue from block 404, the peripheral device of the processing system may verify, at a startup of the computing device or the one or more peripherals, whether the peripheral is enabled or disabled based on the secure register (e.g., peripheral control register 190). In other words, at the startup of the processing system, the one or more peripherals of the processing system may verify an operating state or status, which may be enabled or disabled. As described above regarding block 404, this value may be adjusted after starting up or before startup (e.g., during boot, the bootloader) may disable all peripherals.

Figure 5B:
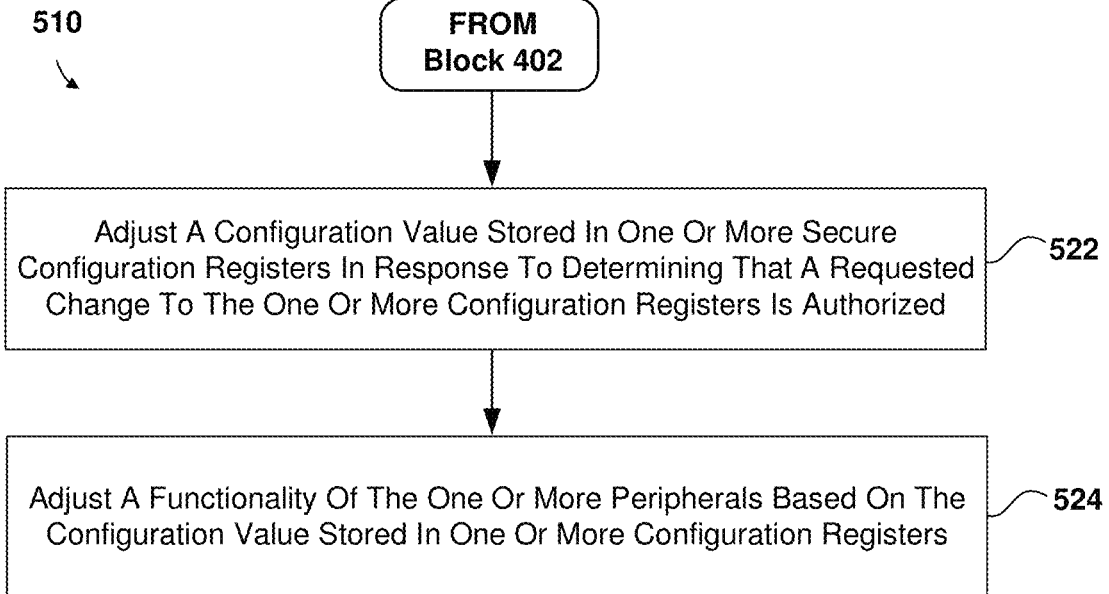
FIG. 5B is a process diagram illustrating an example method suitable for implementing various embodiments.

FIG. 5B is a process diagram illustrating an example method 510 suitable for implementing various embodiments. With reference to FIGS. 1A-5B, the operations and events in blocks 522 and 524 of the method 510 may be performed by the computing device 320, CPU 189, SoC 102, smart glasses 600, or one or more components thereof (e.g., machine-readable instructions 330, processor(s) 350). In some embodiments, the UE may include a processor (e.g., processor 189, 350) configured to perform the operations by processor-executable instructions stored in a non-transitory processor-readable medium (e.g., memory 320, 120). Means for performing the operations of the method 510 may be a processing system (e.g., 100, 300, 600) including one or more processors (e.g., 110, 112, 114, 116, 118, 122, 342, 350, etc.), a wireless transceiver (e.g., 346, 166), and other components described herein. To encompass any of the processor(s), hardware elements and software elements that may be involved in performing the method 510, the elements performing method operations are referred to as a "processing system" or a controller of secure registers for storing configurations and status states for peripherals.

In block 522, which may continue from block 402, the processing system may adjust a configuration value stored in one or more configuration registers (e.g., 195) in response to determining that a requested change to the one or more configuration registers is authorized. As described above, the configuration registers may store configuration settings that define an operation or function of the peripheral, and these configuration registers may have multiple states (i.e., non-binary). An extensible protection unit (XPU) that controls access to the secure registers (e.g., 186) may control access to the configuration registers (e.g., 195) based on the same ownership mask corresponding to a peripheral.

In block 524, the processing system may adjust a functionality of the one or more peripherals based on the configuration value stored in one or more configuration registers (e.g., 195). The adjusted functionality may include any functionality of peripherals connected to the processing system, such as, but not limited a display mode, a resolution, the display or camera frames per second, single core mode, multi-core mode, direct memory access enabled/disabled, one or more clock speeds, resolution capture size, compression rates and access to other post-processing hardware blocks, or scan rates.

Figure 6:
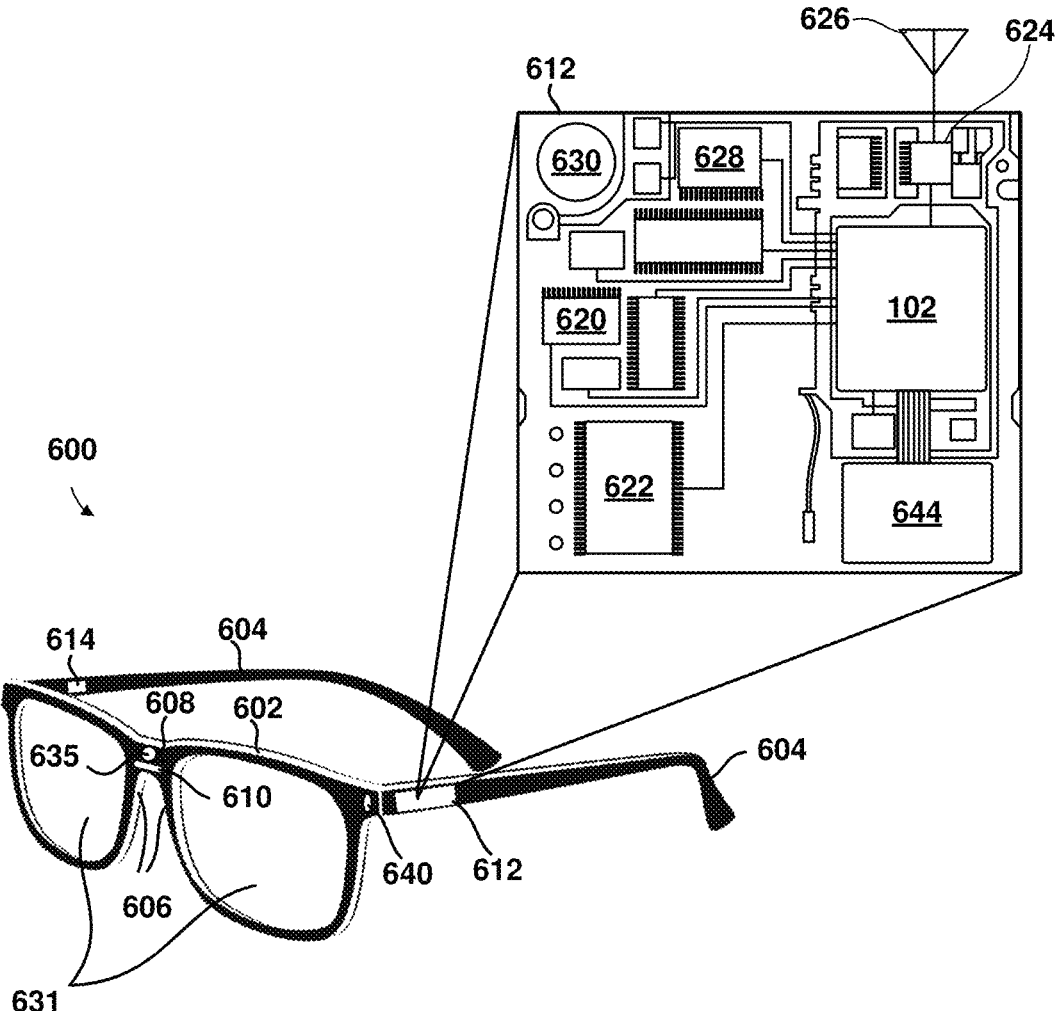
FIG. 6 is a component diagram illustrating an example system according to various embodiments.

Various embodiments (including embodiments discussed above with reference to FIGS. 1A-5B) may be implemented in a variety of wearable devices, an example of which is illustrated in FIG. 6 in the form of smart glasses 600. With reference to FIGS. 1A-6, the smart glasses 600 may operate like conventional eyeglasses, but with enhanced computer features and sensors, like a built-in camera 635 and heads-up display or graphical features on or near the lenses 631. Like any glasses, smart glasses may include a frame 602 coupled to temples 604 that fit alongside the head and behind the ears of a wearer. The frame 602 holds the lenses 631 in place before the wearer's eyes when nose pads 606 on the bridge 608 rest on the wearer's nose.

In some embodiments, smart glasses 600 may include an image rendering device 614 (e.g., an image projector), which may be embedded in one or both temples 604 of the frame 602 and configured to project images onto the optical lenses 631. In some embodiments, the image rendering device 614 may include a light-emitting diode (LED) module, a light tunnel, a homogenizing lens, an optical display, a fold mirror, or other components well-known projectors or head-mounted displays. In some embodiments (e.g., those in which the image rendering device 614 is not included or used), the optical lenses 631 may be or may include see-through or partially see-through electronic displays. In some embodiments, the optical lenses 631 include image-producing elements, such as see-through Organic Light-Emitting Diode (OLED) display elements or liquid crystal on silicon (LCOS) display elements. In some embodiments, the optical lenses 631 may include independent left-eye and right-eye display elements. In some embodiments, the optical lenses 631 may include or operate as a light guide for delivering light from the display elements to the eyes of a wearer.

The smart glasses 600 may include a number of external sensors that may be configured to obtain information about wearer actions and external conditions that may be useful for sensing images, sounds, muscle motions and other phenomenon that may be peripherals controlled by secure registers as described herein. In some embodiments, the smart glasses 600 may include a camera 635 configured to image objects in front of the wearer in still images or a video stream, which may be transmitted to another computing device (e.g., server 385) for analysis. Additionally, the smart glasses 600 may include a ranging sensor 640. In some embodiments, the smart glasses 600 may include a microphone 610 positioned and configured to record sounds in the vicinity of the wearer. In some embodiments, multiple microphones may be positioned in different locations on the frame 602, such as on a distal end of the temples 604 near the jaw, to record sounds made when a user taps a selecting object on a hand, and the like. In some embodiments, the smart glasses 600 may include pressure sensors, such as on the nose pads 606, configured to sense facial movements for calibrating distance measurements. In some embodiments, smart glasses 600 may include other sensors (e.g., a thermometer, heart rate monitor, body temperature sensor, pulse oximeter, etc.) for collecting information pertaining to environment and/or user conditions that may be useful for recognizing an interaction by a user with a virtual user interface. These sensors (e.g., ranging sensors 640) or an inertial measurement unit (IMU) may provide measurements to an image recognition process in order to generate or compile pose information for the user and assist with image recognition. These electronic sensing components may each be peripherals configured to be controlled by peripheral control registers (e.g., 190) and configuration registers (e.g., 195), in which permissions are controlled by owner registers (O).

The processing system 612 may include processing and communication SOCs 102, 644, which may include one or more processors, one or more of which may be configured with processor-executable instructions to perform operations of various embodiments. The processing and communications SOC 102, 644 may be coupled to internal sensors 620, internal memory 622, and communication circuitry 624 coupled to one or more antenna 626 for establishing a wireless data link with an external computing device (e.g., server 385), such as via a Bluetooth or Wi-Fi link. The processing and communication SOCs 102, 644 may also be coupled to sensor interface circuitry 628 configured to control and receive data from a camera(s) 635, microphone(s) 610, and other sensors positioned on the frame 602.

The internal sensors 620 may include an IMU that includes electronic gyroscopes, accelerometers, and a magnetic compass configured to measure movements and orientation of the wearer's head. The internal sensors 620 may further include a magnetometer, an altimeter, an odometer, and an atmospheric pressure sensor, as well as other sensors useful for determining the orientation and motions of the smart glasses 600. Such sensors may be useful in various embodiments for detecting head motions (e.g., pose changes) that may be used to adjust distance measurements as described. The processing system 612 may further include a power source such as a rechargeable battery 630 coupled to the SOCs 102, 644 as well as the external sensors on the frame 602.

Figure 7:
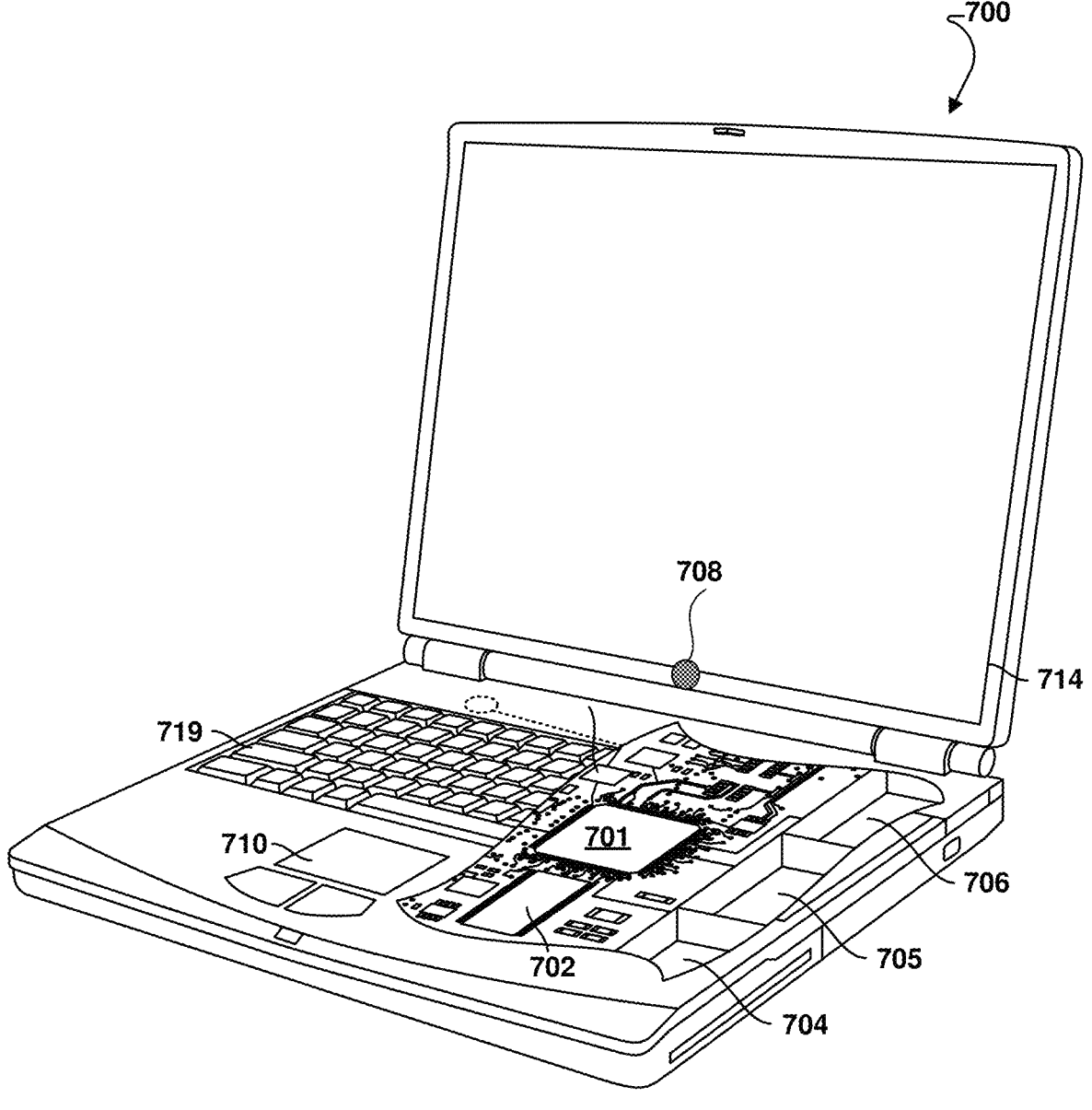
FIG. 7 is a system diagram illustrating a device and components suitable for implementing various embodiments.

Various embodiments may be implemented in a variety of computing devices, such as a laptop computer 700 as illustrated in FIG. 7. A laptop computer 700 may include a processor 701 coupled to volatile memory 702, and a large capacity nonvolatile memory, such as a disk drive 704. The laptop computer 700 may also include an optical drive 705 coupled to the processor 706. The laptop computer 700 may also include a number of connector ports or other network interfaces coupled to the processor 701 for establishing data connections or receiving external devices (e.g., camera 102, smart glasses 600), via Universal Serial Bus (USB) or FireWire® connector sockets, or other network connection circuits for coupling the processor 701 to a network (e.g., a communications network). In a notebook configuration, the computer housing may include the touchpad 710, the keyboard 719, and the display 714 all coupled to the processor 701. The computer housing may include a camera 708 that has a field of view that covers keyboard 719 and may operate as camera 176 for XR functions in some embodiments.

Some embodiments may be implemented on a variety of commercially available computing devices, such as the laptop computer (computing device) 700 illustrated in FIG. 7. The laptop computer 700 may include one or more processors 701 (e.g., multi-core processor, etc.) coupled to volatile memory 702, such as RAM, and a large capacity nonvolatile memory, such as a solid-state drive (SSD) 703. The laptop computer 700 may also include additional storage interfaces such as USB ports and non-volatile memory express (NVMe) slots coupled to the processor 701. The laptop computer 700 may include network access ports 706 coupled to the processor 701 that allow data connections through a network interface card (NIC) 704 and a communication network (e.g., an Internet Protocol (IP) network) connected to other network elements.

Various embodiments and implementations illustrated and described are provided merely as examples to illustrate various features of the claims. However, features shown and described with respect to any given embodiment or implementation are not necessarily limited to the associated embodiment or implementation and may be used or combined with other embodiments that are shown and described. Further, the claims are not intended to be limited by any one example embodiment or implementation. For example, one or more of the methods and operations of FIGS. 4-5B may be substituted for or combined with one or more operations of the methods and operations of FIGS. 4-5B.

In one or more embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include random access memory (RAM), read-only memory (ROM), electrically erasable programmable read-only memory (EEPROM), FLASH memory, solid-state drives (SSD), NVMe drives, three-dimensional (3D) NAND flash, or any other medium that may be used to store target program code in the form of instructions or data structures and that may be accessed by a computer. Modern technologies, such as cloud-based storage solutions, including infrastructure-as-a-service (IaaS) platforms, may offer scalable and distributed options for storing and accessing program code. Additionally, the operations of a method or algorithm may reside as one or any combination or set of codes and/or instructions on a non-transitory processor-readable medium and/or computer-readable medium, which may be incorporated into a computer program product. Emerging technologies, including quantum computing storage media and blockchain-based storage solutions, may further enhance data integrity and security. Artificial intelligence (AI) and machine learning (ML)-optimized hardware accelerators, such as graphical processing units (GPUs) and tensor processing units (TPUs), may be used to execute complex algorithms.

Implementation examples are described in the following paragraphs. While some of the following implementation examples are described in terms of example methods, further example implementations may include the example methods discussed in the following paragraphs implemented by a UE including a processor configured with processor-executable instructions to perform operations of the methods of the following implementation examples; the example methods discussed in the following paragraphs implemented by a UE including means for performing functions of the methods of the following implementation examples; and the example methods discussed in the following paragraphs may be implemented as a non-transitory processor-readable storage medium having stored thereon processor-executable instructions configured to cause a processor of a UE to perform the operations of the methods of the following implementation examples.

Example 1. A method for controlling one or more peripherals of a computing device, including: determining whether a requested change to a secure register is authorized; adjusting a value stored in the secure register in response to determining that the requested change to the secure register is authorized; determining, at the one or more peripherals, one or more parameters of the one or more peripherals based on the value stored in the secure register; and controlling a functionality of the one or more peripherals based on the one or more parameters or the value stored in the secure register.

Example 2. The method of example 1, in which controlling the functionality of the peripheral device includes enabling or disabling the one or more peripherals.

Example 3. The method of either of examples 1 or 2, further including verifying, at a startup of the computing device or the one or more peripherals, whether a peripheral is enabled or disabled based on the secure register.

Example 4. The method of any of examples 1-3, further including adjusting a configuration value stored in one or more configuration registers in response to determining that the requested change to the one or more configuration registers is authorized; and adjusting a functionality of the one or more peripherals based on the configuration value stored in the one or more configuration registers.

Example 5. The method of any of examples 1-4, in which the functionality includes at least one of a display mode, a resolution, a frames per second, single core mode, multi-core mode, direct memory access enabled/disabled, one or more clock speeds, resolution capture size, compression rates and access to other post-processing hardware blocks, or scan rates.

Example 6. The method of any of examples 1-5, in which determining whether the requested change to a secure register is authorized is performed by an extensible protection unit that controls access to the secure registers; and in which access to the secure registers is controlled for multiple entities including at least one of: users, applications, original equipment manufacturers (OEMs), or other clients of the computing device.

Example 7. The method of any of examples 1-6, in which access to the secure registers is controlled for the multiple entities based on a shared mask value stored in an access register, in which each entity or group of entities is assigned a position or value in the shared mask.

Example 8. The method of any of examples 1-7, in which access control by an extensible protection unit controls whether an entity of the multiple entities is permitted to modify settings of the one or more peripherals via additional registers.

Example 9. The method of any of examples 1-8, in which the secure register is disposed on one of the one or more peripherals.

Example 10. The method of any of examples 1-8, in which the secure register is disposed outside the one or more peripherals and on the computing device.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, or a computer. By way of illustration, both an application running on a wireless device and the wireless device may be referred to as a component. One or more components may reside within a process or thread of execution and a component may be localized on one processor or core or distributed between two or more processors or cores. In addition, these components may execute from various non-transitory computer readable media having various instructions or data structures stored thereon. Components may communicate by way of local or remote processes, function or procedure calls, electronic signals, data packets, memory read/writes, and other known network, computer, processor, or process-related communication methodologies.

A number of different cellular and mobile communication services and standards are available or contemplated in the future, all of which may implement and benefit from the various embodiments. Such services and standards include, e.g., third-generation partnership project (3GPP), long-term evolution (LTE) systems, third-generation wireless mobile communication technology (3G), fourth-generation wireless mobile communication technology (4G), fifth-generation wireless mobile communication technology (5G) as well as later generation 3GPP technology, global system for mobile communications (GSM), universal mobile telecommunications system (UMTS), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only and are not intended to limit the scope of the claims to a particular communication system or technology unless specifically recited in the claim language.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disc, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments described herein but is to be accorded the widest scope consistent with the following claims and the principles and novel features disclosed herein.

What is claimed is:

1. A method for controlling one or more peripherals of a computing device, comprising:

determining whether a requested change to a secure register is authorized;

adjusting a value stored in the secure register in response to determining that the requested change to the secure register is authorized;

determining, at the one or more peripherals, that the value stored in the secure register corresponds to one or more parameters of the one or more peripherals; and controlling a functionality of the one or more peripherals based on the one or more parameters or the value stored in the secure register.

2. The method of claim 1, wherein controlling the functionality of the one or more peripherals includes enabling or disabling the one or more peripherals.

3. The method of claim 2, further comprising verifying, at a startup of the computing device or the one or more peripherals, whether a peripheral is enabled or disabled based on the secure register.

4. The method of claim 1, further comprising:

adjusting a configuration value stored in one or more configuration registers in response to determining that the requested change to the one or more configuration registers is authorized; and adjusting a functionality of the one or more peripherals based on the configuration value stored in the one or more configuration registers.

5. The method of claim 1, wherein:

determining whether the requested change to the secure register is authorized is performed by an extensible protection unit that controls access to the secure register; and access to the secure register is controlled for multiple entities including at least one of: users, applications, original equipment manufacturers (OEMs), or other clients of the computing device.

6. The method of claim 5, wherein access to the secure register is controlled for the multiple entities based on a shared mask value stored in an access register, in which each entity or group of entities is assigned a position or value in the shared mask.

7. The method of claim 5, wherein access control by the extensible protection unit controls whether an entity of the multiple entities is permitted to modify settings of the one or more peripherals via additional registers.

8. The method of claim 1, wherein the secure register is disposed on one of the one or more peripherals.

9. The method of claim 1, wherein the secure register is disposed outside the one or more peripherals and on the computing device.

10. A computing device, comprising:

one or more peripheral components;

two or more secure registers including:

a peripheral control register configured to:

store a control value; and control a first functionality of the one or more peripheral components based on the control value, a configuration register configured to:

store a configuration value; and control a second functionality of the one or more peripheral components based on the configuration value, an extensible protection unit (XPU) configured to:

determine whether a requested change to one of the two or more secure registers is authorized; and adjust the control value or the configuration value in response to determining that the requested change to one of the two or more secure registers is authorized.

11. The computing device of claim 10, wherein the peripheral control register is further configured to control the first functionality of the one or more peripheral components by enabling or disabling the one or more peripheral components.

12. The computing device of claim 10, wherein the XPU is further configured to:

verify, at a startup of the computing device or the one or more peripheral components, whether a peripheral component is enabled or disabled based on the peripheral control register.

13. The computing device of claim 10, wherein the XPU is further configured to:

adjust the configuration value stored in the configuration register in response to determining that the requested change to the one or more configuration register is authorized.

14. The computing device of claim 10, wherein the XPU is further configured to:

control access to one of the two or more secure registers as part of determining whether the requested change to one of the two or more secure registers is authorized; and control access to the two or more secure registers for multiple entities including at least one of: users, applications, original equipment manufacturers (OEMs), or other clients of the computing device.

15. The computing device of claim 14, wherein the XPU is further configured to control access to the two or more secure registers for the multiple entities based on a shared mask value stored in an access register, in which each entity or group of entities is assigned a position or value in the shared mask.

16. The computing device of claim 14, wherein access control by the XPU controls whether an entity of the multiple entities is permitted to modify settings of the one or more peripheral components via additional registers.

17. The computing device of claim 10, wherein the configuration register is disposed on one of the one or more peripheral components.

18. The computing device of claim 10, wherein the configuration register is disposed outside the one or more peripheral components and on the computing device.

19. A non-transitory processor-readable medium having stored thereon processor-executable instructions configured to cause a processor of a computing device including one or more peripheral components to perform operations comprising:

determining whether a requested change to a secure register is authorized;

adjusting a value stored in the secure register in response to determining that the requested change to the secure register is authorized;

determining, at the one or more peripheral components, that the value stored in the secure register corresponds to one or more parameters of the one or more peripheral components; and controlling a functionality of the one or more peripheral components based on the one or more parameters or the value stored in the secure register.

20. The non-transitory processor-readable medium of claim 19, wherein the stored processor-executable instructions are configured to cause the processor of the computing device to perform operations further comprising:

adjusting a configuration value stored in one or more configuration registers in response to determining that the requested change to the one or more configuration registers is authorized; and adjusting a functionality of the one or more components based on the configuration value stored in the one or more configuration registers.

* * * * *